(12) United States Patent
Kim

(10) Patent No.: US 12,371,034 B2
(45) Date of Patent: Jul. 29, 2025

(54) REDUNDANT CONTROL SYSTEM AND METHOD FOR AUTONOMOUS STEERING

(71) Applicants: Kia Corporation, Seoul (KR); Hyundai Motor Company, Seoul (KR)

(72) Inventor: Jung Wan Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 316 days.

(21) Appl. No.: 18/045,996

(22) Filed: Oct. 12, 2022

(65) Prior Publication Data

US 2023/0159042 A1 May 25, 2023

(30) Foreign Application Priority Data

Nov. 22, 2021 (KR) ........................ 10-2021-0160945

(51) Int. Cl.
*B60W 50/029* (2012.01)
*B60W 10/18* (2012.01)
*B60W 10/20* (2006.01)
*B60W 30/18* (2012.01)

(52) U.S. Cl.
CPC .......... *B60W 50/029* (2013.01); *B60W 10/18* (2013.01); *B60W 10/20* (2013.01); *B60W 30/18145* (2013.01); *B60W 2520/10* (2013.01); *B60W 2520/105* (2013.01); *B60W 2520/125* (2013.01)

(58) Field of Classification Search
CPC .... B60W 50/029; B60W 10/18; B60W 10/20; B60W 30/18145; B60W 2520/10; B60W 2520/105; B60W 2520/125
See application file for complete search history.

(56) References Cited

U.S. PATENT DOCUMENTS

| | | | |
|---|---|---|---|
| 8,423,257 B2 | 4/2013 | Ellis et al. | |
| 9,452,760 B2 | 9/2016 | Oyama et al. | |
| 9,610,947 B2 | 4/2017 | De Bruin et al. | |
| 9,776,641 B2 | 10/2017 | Matsuno et al. | |

(Continued)

FOREIGN PATENT DOCUMENTS

| | | | |
|---|---|---|---|
| JP | 2003063373 A | 3/2003 | |
| JP | 2016094038 A | 5/2016 | |

*Primary Examiner* — Naeem Taslim Alam
(74) *Attorney, Agent, or Firm* — SLATER MATSIL, LLP

(57) ABSTRACT

An embodiment is a redundant control system for autonomous steering including a sensor in a vehicle configured to sense information for autonomous driving, a main steerer configured to actuate a steering motor to perform steering, first autonomous controller configured to use data provided from the sensor to determine a target steering angle through real-time lane recognition and to control the main steerer, an auxiliary steerer configured to use a brake module composed of a main brake and an auxiliary brake to perform steering, and a second autonomous controller configured to control the auxiliary steerer to perform supplementary steering through partial braking and application of additional actuation in the event of abnormal operation of an automatic steering function using the first autonomous controller and to control backup braking through the auxiliary brake when the main brake fails.

16 Claims, 17 Drawing Sheets

(56) References Cited

U.S. PATENT DOCUMENTS

| | | | |
|---|---|---|---|
| 11,624,379 B2* | 4/2023 | McNamee | B60T 10/04 |
| | | | 137/87.01 |
| 2013/0253793 A1* | 9/2013 | Lee | B60W 50/029 |
| | | | 701/70 |
| 2015/0120144 A1* | 4/2015 | De Bruin | B60W 10/04 |
| | | | 701/41 |
| 2015/0298694 A1* | 10/2015 | Park | B60W 10/04 |
| | | | 701/41 |
| 2016/0090100 A1* | 3/2016 | Oyama | B62D 15/025 |
| | | | 701/23 |
| 2016/0325721 A1* | 11/2016 | Jonasson | B60T 8/171 |
| 2019/0331221 A1* | 10/2019 | Shirakawa | B60T 11/10 |
| 2020/0232842 A1* | 7/2020 | Huang | B60W 30/143 |
| 2021/0094560 A1 | 4/2021 | Wu et al. | |
| 2023/0150521 A1* | 5/2023 | Jeon | B60W 10/18 |
| | | | 701/70 |

* cited by examiner

REDUNDANT CONTROL SYSTEM AND METHOD FOR AUTONOMOUS STEERING

CROSS-REFERENCE TO RELATED APPLICATIONS

This application claims the benefit of Korean Patent Application No. 10-2021-0160945, filed on Nov. 22, 2021, which application is hereby incorporated herein by reference.

TECHNICAL FIELD

The present invention relates to a redundant control system and method for autonomous steering.

BACKGROUND

In general, autonomous vehicles refer to vehicles that may autonomously travel to set destinations by monitoring external information and grasping road conditions for themselves without any driver intervention.

Accordingly, conventional autonomous vehicles have evolved in a variety of directions to improve electronic steering technology. Particularly, in terms of stability, a technology is known for mounting a plurality of electronic steering devices for backup in case any electronic steering device is not operating.

The plurality of electronic steering devices require a plurality of separate ECUs, power sources, sensors, motors, and the like. These electronic steering devices may cause an increase in body weight and cost.

SUMMARY

Accordingly, embodiments of the present invention is directed to a redundant control system and method for autonomous steering that substantially obviate one or more problems due to limitations and disadvantages of the related art.

An object of embodiments of the present invention is to provide a redundant control system and method for autonomous steering, which are capable of utilizing a brake module by an autonomous controller to ensure steering redundancy without adding a separate redundant actuator for automatic steering.

Another object of embodiments of the present invention is to provide a redundant control system and method for autonomous steering, which are capable of utilizing an automatic braking system independent of an existing steering device to ensure steering redundancy.

Still another object of embodiments of the present invention is to provide a redundant control system and method for autonomous steering, which are capable of controlling an autonomous vehicle to travel at a normal target speed and steering angle even when it is impossible to respond to turning movement due to failure of an automatic steering system.

A further object of embodiments of the present invention is to provide a redundant control system and method for autonomous steering, which allow a main brake system and an auxiliary brake system to perform steering and deceleration in the event of failure of an automatic steering system.

Additional advantages, objects, and features of embodiments of the invention will be set forth in part in the description which follows and in part will become apparent to those having ordinary skill in the art upon examination of the following or may be learned from practice of the invention. The objectives and other advantages of embodiments of the invention may be realized and attained by the structure particularly pointed out in the written description and claims hereof as well as the appended drawings.

To achieve these objects and other advantages and in accordance with the purpose of embodiments of the invention, as embodied and broadly described herein, there is provided a redundant control system for autonomous steering, which allows an autonomous vehicle to turn through partial braking control of a main brake system in the event of failure of a steering system and to use an auxiliary brake system for partial braking and deceleration even if a main brake system fails.

Embodiments provide a redundant control system for autonomous steering, which includes a sensor unit installed in a vehicle to sense information required for autonomous driving, a main steering unit configured to actuate a steering motor to perform steering, a first autonomous control unit configured to use data provided from the sensor unit to determine a target steering angle through real-time lane recognition and to control the main steering unit, an auxiliary steering unit configured to use a brake module composed of a main brake and an auxiliary brake to perform steering, and a second autonomous control unit configured to control the auxiliary steering unit to perform supplementary steering through partial braking and application of additional actuation in the event of abnormal operation of an automatic steering function using the first autonomous control unit and to control backup braking through the auxiliary brake when the main brake fails.

In the redundant control system, the second autonomous control unit may include a sensing part configured to determine whether a primary steering backup mode and a secondary steering backup mode are present, a control part configured to select a partial braking control wheel according to a turning direction and a reference drive wheel and to increase braking pressure to a lateral-acceleration-sensor's target value (Target Ay) to perform partial braking while compensating for deceleration caused by the partial braking, and an execution part configured to perform engine control by increasing or decreasing pressure applied to the main brake and/or the auxiliary brake in response to a partial braking pressure control signal calculated by the control part.

In the redundant control system, the sensing part may determine whether partial braking is possible based on information on whether autonomous steering is normal, information on whether the main brake is normal, and multiple types of additional information.

In the redundant control system, the additional information may include autonomous target driving speed information, information on whether a driving line is normal, global positioning system (GPS) & manifold absolute pressure (MAP) information, longitudinal acceleration sensor and lateral acceleration sensor information, and information on whether lane change is possible.

In the redundant control system, the sensing part may determine that the partial braking is impossible when the additional information is abnormal or when engine torque is unavailable.

In the redundant control system, upon determining by the sensing part that the partial braking is impossible, the execution part may control all drive wheels to decelerate and stop the vehicle with safety.

In the redundant control system, the execution part may transmit an alarm related to emergency braking to the inside and outside of the vehicle.

In the redundant control system, the execution part may include an intelligent electronic brake (IEB) configured to provide pressure for partial braking to drive wheels, a redundant brake control unit (RCU) configured to control front-wheel partial braking for implementation of turning, and an electronic parking brake (EPB) configured to control rear-wheel partial braking for implementation of turning.

In the redundant control system, when an autonomous target driving speed is expressed as "V", a target turning radius is expressed as "R", and a corrected lateral acceleration sensor value according to a bank angle is expressed as "Ay_offset", the lateral-acceleration-sensor's target value (Target Ay) calculated by the control part may be calculated by Equation Target Ay=$(V^2/R)$+Ay_offset.

In the redundant control system, the control part may control partial braking by selecting a right wheel when a vehicle direction turning radius value is clockwise and selecting a left wheel when the vehicle direction turning radius value is counterclockwise.

In the redundant control system, the control part may compare an autonomous target driving speed with a current vehicle speed and calculate required change torque for controlling required drive wheel acceleration to correct deceleration.

Embodiments provide a redundant control system for autonomous steering, which includes a sensor unit installed in an autonomous vehicle to sense information required for autonomous driving, a steering unit configured to use data provided from the sensor unit to determine a target steering angle through real-time lane recognition and to control the autonomous vehicle to stay in the center of a target lane, a main brake control unit configured to output a control signal to generate friction braking force by hydraulic pressure in a drive wheel brake, an auxiliary brake control unit configured to perform an auxiliary brake function when braking force is not applied to each wheel due to failure of the main brake control unit, and an autonomous control unit configured to control turning of the vehicle through partial braking control by the main brake control unit when the steering unit fails and to control turning of the vehicle through partial braking control by the auxiliary brake control unit when the steering unit and the main brake control unit fail.

Embodiments provide a redundant control method for autonomous steering, which includes a first determination process of determining whether partial braking control is possible, a second determination process of determining whether a steering unit is abnormal, a third determination process of determining whether a main brake control unit is abnormal, a primary steering backup process of controlling turning of a vehicle through partial braking and application of additional actuation by the main brake control unit when the steering unit is abnormal and the main brake control unit is normal, and a secondary steering backup process of controlling turning and stopping of the vehicle through partial braking and application of additional actuation by the auxiliary brake control unit when the steering unit and the main brake control unit are abnormal.

The redundant control method may further include a process of decelerating and stopping the vehicle with safety by controlling all drive wheels when it is determined that the partial braking control is impossible in the first determination process.

In the redundant control method, the first determination process may determine whether partial braking is possible based on information on whether autonomous steering is normal, information on whether a main brake is normal, and multiple types of additional information.

In the redundant control method, each of the primary steering backup process and the secondary steering backup process may include selecting a partial braking control wheel according to a turning direction and a reference drive wheel, increasing braking pressure to a lateral-acceleration-sensor's target value (Target Ay) to perform partial braking, and compensating for deceleration caused by the partial braking.

In the redundant control method, the selecting a partial braking control wheel may include selecting a right wheel when a vehicle direction turning radius value is clockwise and selecting a left wheel when the vehicle direction turning radius value is counterclockwise.

In the redundant control method, the compensating for deceleration caused by the partial braking may include comparing an autonomous target driving speed with a current vehicle speed and calculating required change torque for controlling required drive wheel acceleration to correct deceleration.

It is to be understood that both the foregoing general description and the following detailed description of embodiments of the present invention are exemplary and explanatory and are intended to provide further explanation of embodiments of the invention as claimed.

BRIEF DESCRIPTION OF THE DRAWINGS

The accompanying drawings, which are included to provide further understanding and are incorporated in and constitute a part of this application, illustrate embodiment(s) of the invention and together with the description serve to explain the principle of embodiments of the invention. In the drawings.

DETAILED DESCRIPTION OF ILLUSTRATIVE EMBODIMENTS

Figure 1:
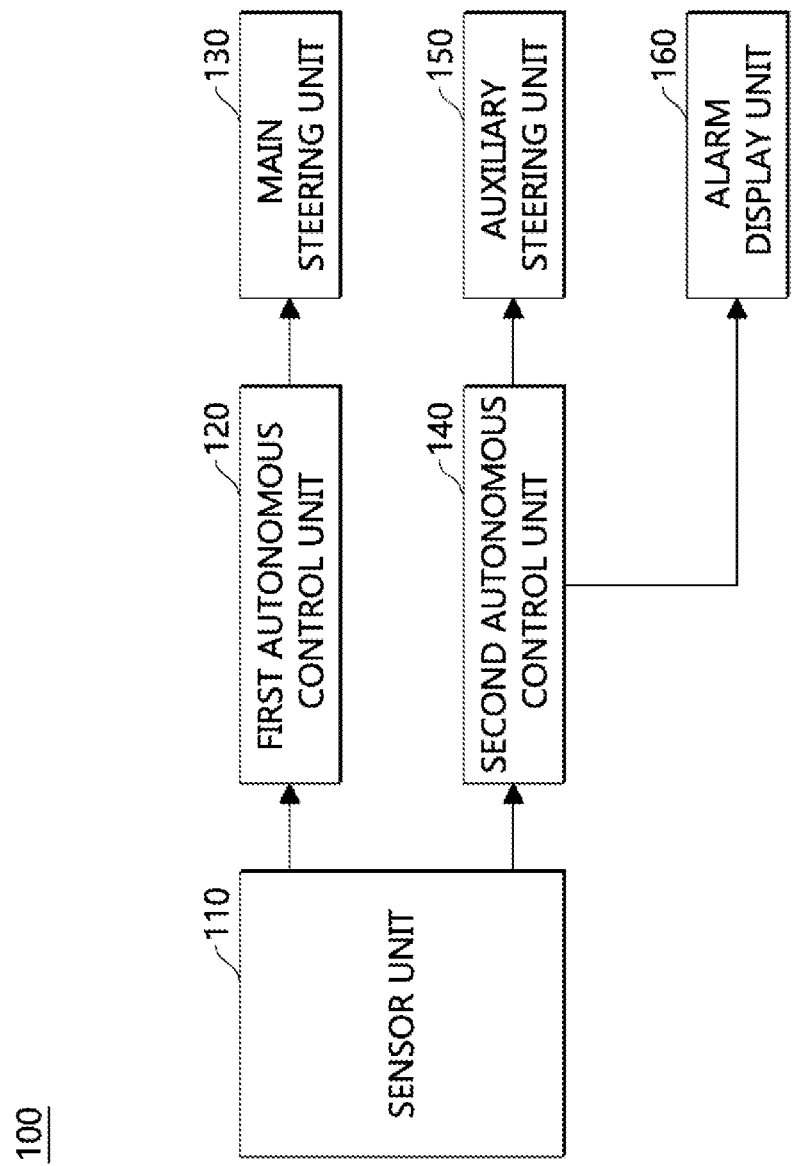
FIG. 1 is a block diagram schematically illustrating a configuration of a redundant control system for autonomous steering according to some embodiments.

The specific structural and functional descriptions disclosed herein are merely illustrated for the purpose of describing embodiments of the present invention. The present invention may be embodied in different forms, and should not be construed as being limited to the embodiments set forth herein.

Specific embodiments will be described in detail below with reference to the accompanying drawings since the embodiments of the present invention may be subjected to various modifications and have various examples. It should be understood, however, that the present invention is not intended to be limited to the specific embodiments, but the present invention includes all modifications, equivalents or replacements that fall within the spirit and scope of the invention as defined in the following claims.

Terms such as "first" and/or "second" may be used herein to describe various elements of embodiments of the present invention, but these elements should not be construed as being limited by the terms. These terms will be used only for the purpose of differentiating one element from other elements of embodiments of the present invention. For example, without departing from the scope and spirit of embodiments of the present invention, a first element may be referred to as a second element, and, similarly, a second element may also be referred to as a first element.

It will be understood that when an element is referred to as being "coupled" or "connected" to another element, it can be directly coupled or connected to the other element or intervening elements may also be present. On the other hand, it will be understood that when an element is referred to as being "directly coupled" or "directly connected" to another element, no intervening elements are present. Other expressions for describing relationships between elements, for example, "between" and "immediately between" or "neighboring" and "directly neighboring" may also be interpreted likewise.

The terminology used herein is for the purpose of describing particular embodiments only, and is not intended to limit the present invention. As used herein, the singular forms "a", "an" and "the" are intended to include the plural forms as well, unless context clearly indicates otherwise. It will be further understood that the terms "comprises/includes" and/or "comprising/including", when used in the specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms used herein, including technical and scientific terms, have the same meanings as those commonly understood by one of ordinary skill in the art. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

Meanwhile, when an embodiment is otherwise implementable, the functions or operations specified in a specific block may occur in a different order from those specified in the flowchart. For example, two consecutive blocks may be performed substantially simultaneously, or the blocks may be performed in reverse according to the function or operation related thereto.

Hereinafter, a redundant control system and method for autonomous steering according to embodiments of the present invention will be described with reference to the accompanying drawings.

FIG. 1 is a block diagram schematically illustrating a configuration of the redundant control system for autonomous steering according to some embodiments. As illustrated, the redundant control system for autonomous steering, which is designated by reference numeral 100, includes a sensor unit 110, a first autonomous control unit 120, a main steering unit 130, a second autonomous control unit 140, an auxiliary steering unit iso, and an alarm display unit 160.

The sensor unit 110 is installed in a vehicle to obtain various types of information required for autonomous driving and provide them to the first autonomous control unit 120 and the second autonomous control unit 140.

The first autonomous control unit 120 uses the data provided from the sensor unit 110 to determine a target steering angle through real-time lane recognition to control the main steering unit 130. In this case, the main steering unit 130 performs steering by, for example, actuating a motor-assisted hydraulic steering system (MAHS).

The second autonomous control unit 140 controls the auxiliary steering unit 150 to perform supplementary steering through partial braking and application of additional actuation in the event of abnormal operation of an automatic steering function using the first autonomous control unit 120. The auxiliary steering unit 150 includes a brake module consisting of a main brake and an auxiliary brake. The second autonomous control unit 140 controls the auxiliary brake to stop an autonomous vehicle in a safe zone even when it is impossible to respond to the turning movement of the autonomous vehicle using the main brake due to failure of an automatic steering system, and then allows the alarm display unit 160 to display that the vehicle is stopped due to an emergency situation.

Figure 2:
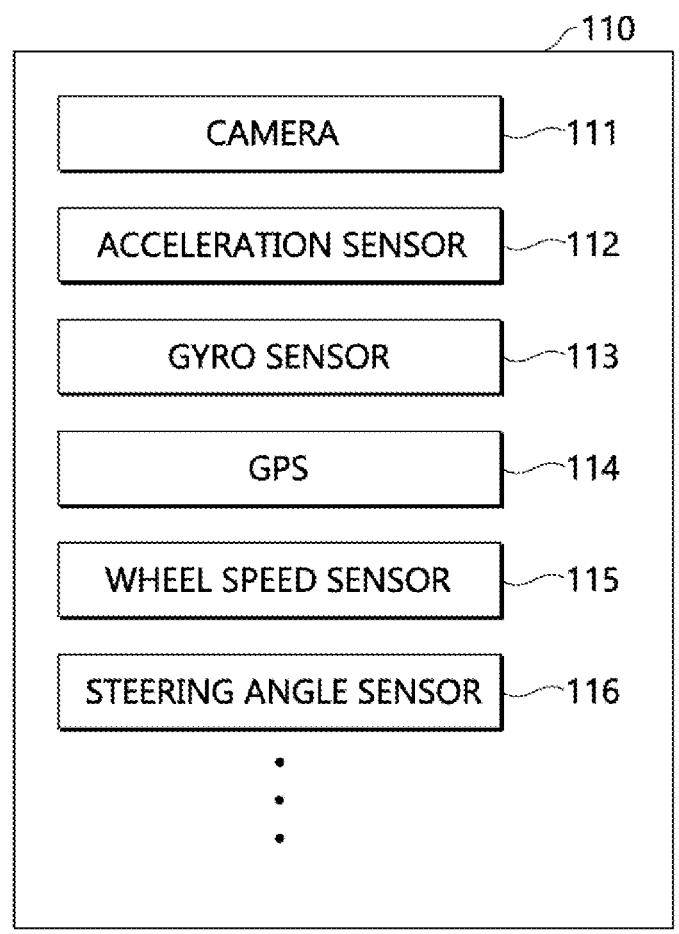
FIG. 2 is an exemplary diagram schematically illustrating a configuration of a sensor unit of the redundant control system for autonomous steering according to some embodiments.

FIG. 2 is an exemplary diagram schematically illustrating a configuration of the sensor unit of the redundant control system for autonomous steering according to some embodiments. The sensor unit 110 serves to collect information internal and external to the vehicle. The information internal to the vehicle refers to information measured by a variety of sensors installed inside the vehicle, for example, a pedal effort sensor, a wheel speed sensor, a wheel hydraulic pressure sensor, a lateral acceleration sensor, a turning angle sensor, and a steering angle sensor. The information external to the vehicle refers to information collected by RADAR, LIDAR, an image sensor, a GPS, a navigation system, etc., to recognize obstacles or lanes on the road on which the autonomous vehicle is traveling or to grasp a driving route of the autonomous vehicle. In an embodiment of the present invention, the sensor unit 110 may include a camera 111 configured to obtain an image external to the vehicle, including the lane, an acceleration sensor 112 configured to sense a change in longitudinal and/or lateral speed of the vehicle, a gyro sensor 113 installed in a specific portion of the vehicle to measure an angle when the vehicle rotates in response to steering, a GPS 114 configured to obtain current location information of the vehicle, a wheel speed sensor 115 installed on each wheel to measure a speed of the wheel of the traveling vehicle, a steering angle sensor 116 configured to measure a current steering angle, which is an actual angle of rotation of a steering wheel, to directly measure how much the steering wheel has rotated, and the like. In addition, the sensor unit 110 may include various sensors such as a tire pressure sensor, a temperature sensor, a torque sensor, and a motor torque sensor.

Figure 3A:
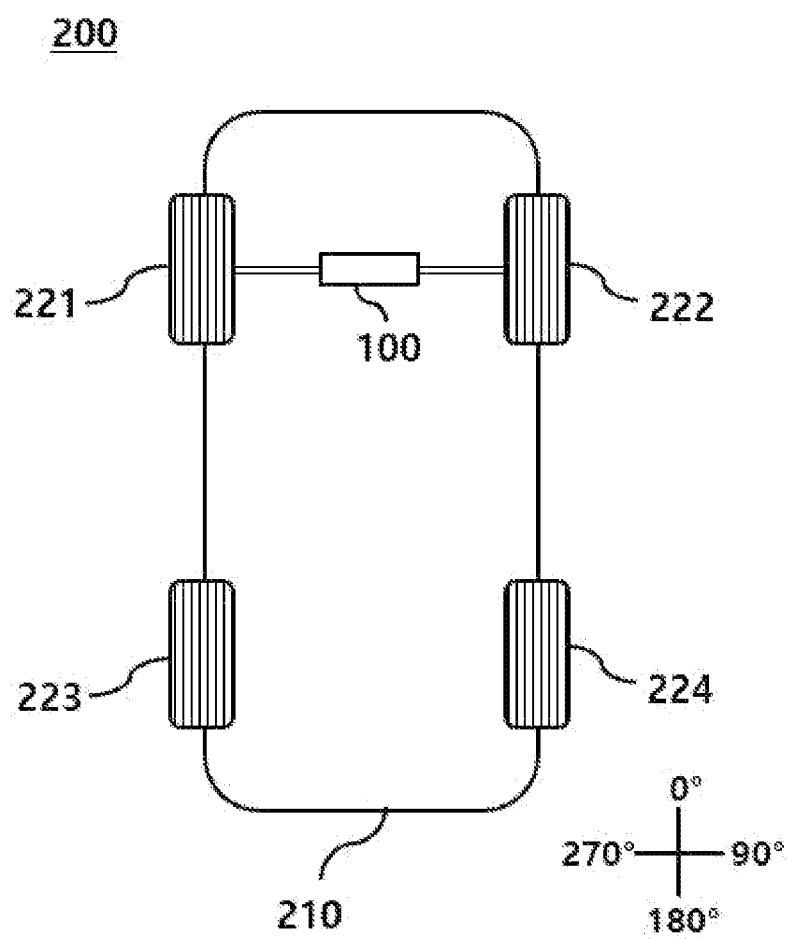
FIGS. 3A to 3D are exemplary views schematically illustrating an operation of using an auxiliary steering unit to implement partial braking when a steering unit fails in the redundant control system for autonomous steering according to some embodiments.

FIG. 3A illustrates a state in which the first autonomous control unit 120 of the redundant control system for autonomous steering 100 controls the main steering unit 130 so that the vehicle is steered under normal situations. In the present embodiment, a front-wheel drive autonomous vehicle is illustrated as an example. The steering angle sensor 116 of the autonomous vehicle measures a current steering angle, which is the actual angle of rotation of the steering wheel. The steering angle sensor 116 may directly measure how much the steering wheel has rotated. The current steering angle is input to the first autonomous control unit 120. The first autonomous control unit 120 controls the main steering unit 130 by comparing the current steering angle with a target steering angle for automatic driving. In this case, the direction of the wheels 221 and 222 coincides with the direction of the vehicle body 210.

Figure 3B:
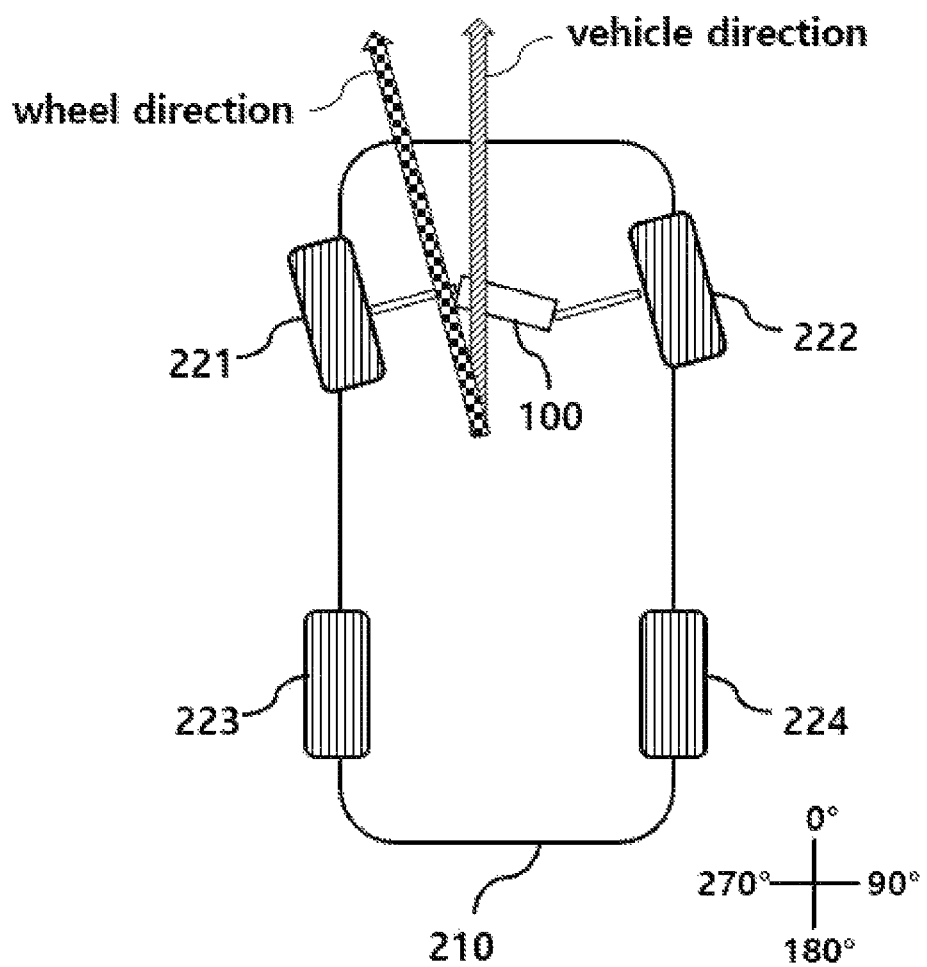
Figure 3C:
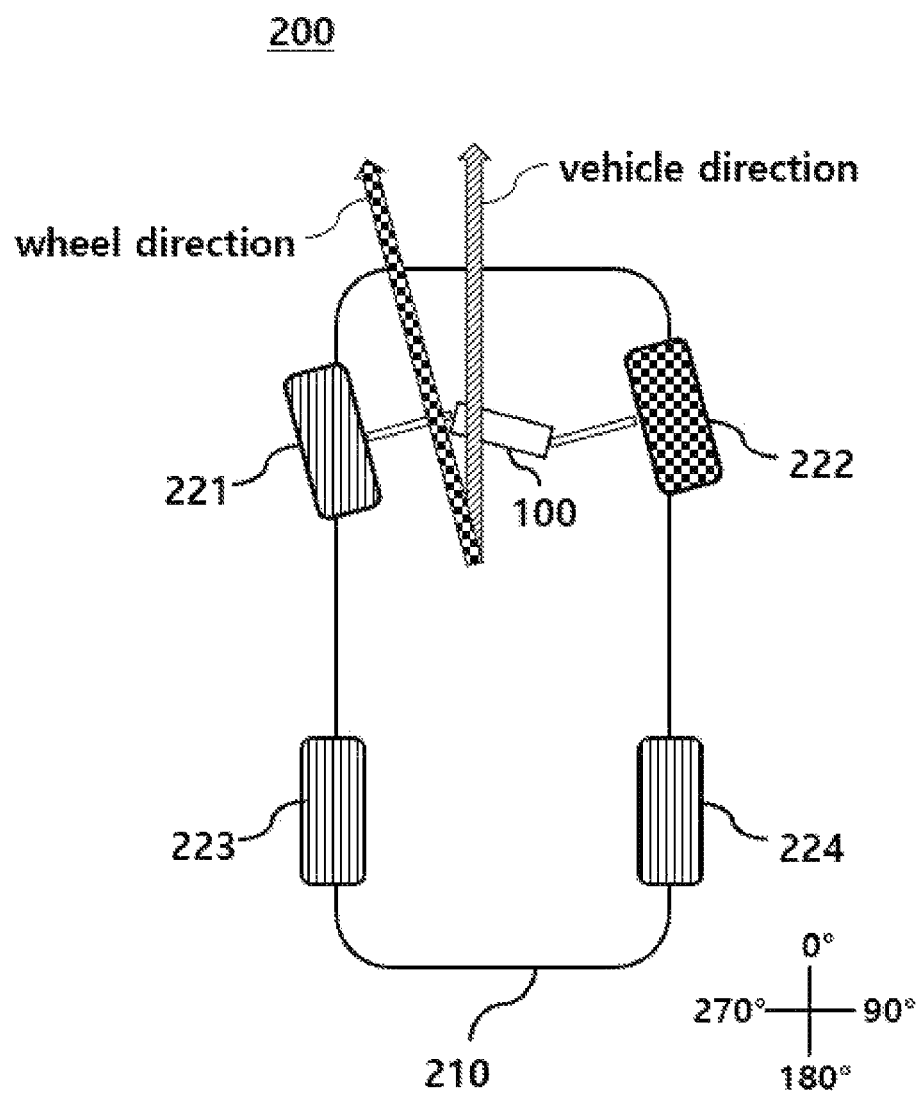
Figure 3D:
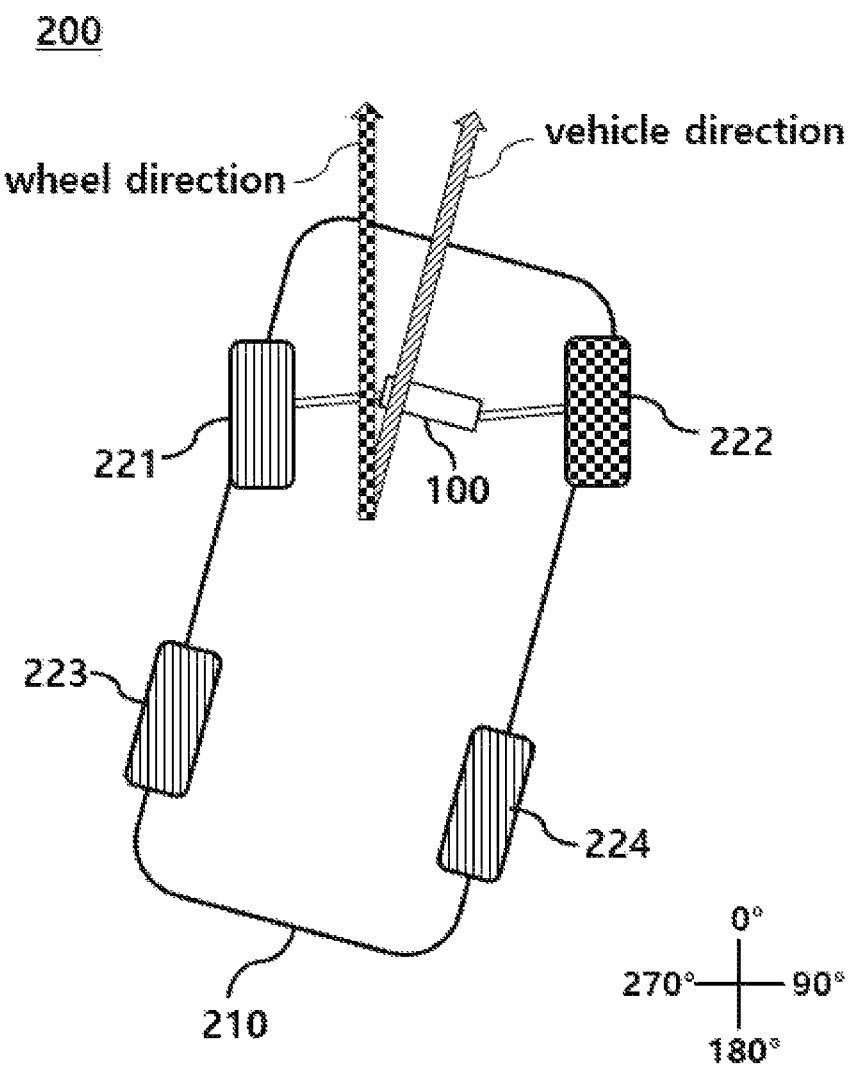

FIGS. 3B to 3D are exemplary views schematically illustrating an operation in which the second autonomous control unit 140 of the redundant control system for autonomous steering 100 controls the auxiliary steering unit 150 for implementation of partial braking when the main steering unit fails in the redundant control system for autonomous steering according to some embodiments. In the event of an emergency situation such as when the wheels 221 and 222 malfunction in an unintended direction or fail while being biased in one direction, as illustrated in FIG. 3B, the vehicle direction in the vehicle body follows the wheel direction (−30° direction) in the wheels 221 and 222 differently from a target direction (0° direction).

In this case, the second autonomous control unit 140 of the redundant control system for autonomous steering 100 activates the auxiliary steering unit for ensuring additional steering force, as illustrated in FIG. 3C. For example, the second autonomous control unit 140 of the redundant control system for autonomous steering 100 applies a braking force to the wheel 222 in the target direction. When a biased braking force is applied to only one wheel 222, additional steering force may be ensured by virtue of the rotational force generated in the vehicle body.

Then, as illustrated in FIG. 3D, the vehicle body may be moved properly toward the target direction. That is, since an additional steering force equal to the steering force of the wheels is generated in a direction opposite to the wheels although the wheels are not properly oriented, the direction of the front wheels 221 and 222 may be switched to the target direction (0° direction) so that the vehicle body is steered in the target direction.

Figure 4:
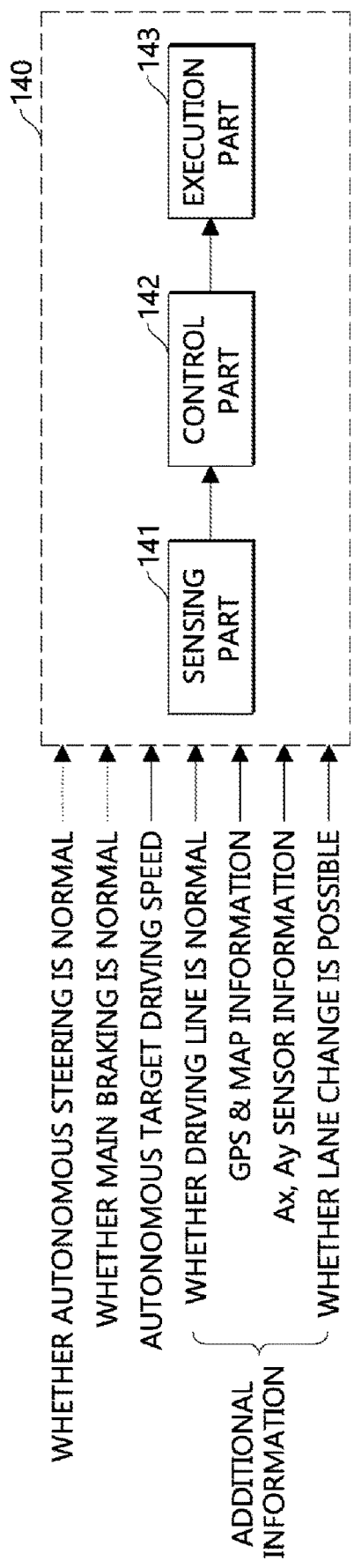
FIG. 4 is a block diagram schematically illustrating a configuration of a second autonomous control unit of the redundant control system for autonomous steering according to some embodiments.

FIG. 4 is a block diagram schematically illustrating a configuration of the second autonomous control unit of the redundant control system for autonomous steering according to some embodiments. The second autonomous control unit 140 includes a sensing part 141, a control part 142, and an execution part 143. The second autonomous control unit 140 receives whether autonomous steering is normal, whether main braking is normal, and additional information. The second autonomous control unit 140 determines whether partial braking is possible based on the information on whether the autonomous steering is normal, the information on whether the main brake is normal, and the multiple types of additional information. The additional information may include autonomous target driving speed information, information on whether a driving line is normal, global positioning system (GPS) & manifold absolute pressure (MAP) information, longitudinal acceleration sensor and lateral acceleration sensor information, and information on whether lane change is possible.

The sensing part 141 determines whether a primary steering backup mode and a secondary steering backup mode are present based on the input information. If at least one of the multiple types of additional information is abnormal or if engine torque is unavailable, it is determined that the partial braking is impossible.

The control part 142 selects a partial braking control wheel according to a turning direction and a reference drive wheel and increases braking pressure to a lateral-acceleration-sensor's target value (Target Ay) to perform the partial braking while compensating for the deceleration caused by the partial braking.

The execution part 143 performs engine control by increasing or decreasing the pressure applied to the main brake and/or the auxiliary brake in response to the partial braking pressure control signal calculated by the control part 142. Upon determining by the sensing part 141 that partial braking is impossible, the execution part 143 controls all drive wheels to safely steer and decelerate the vehicle for stopping the vehicle in a safe place. The execution part 143 controls the alarm display unit 160 to transmit an alarm related to emergency braking to the inside and outside of the vehicle.

Figure 5:
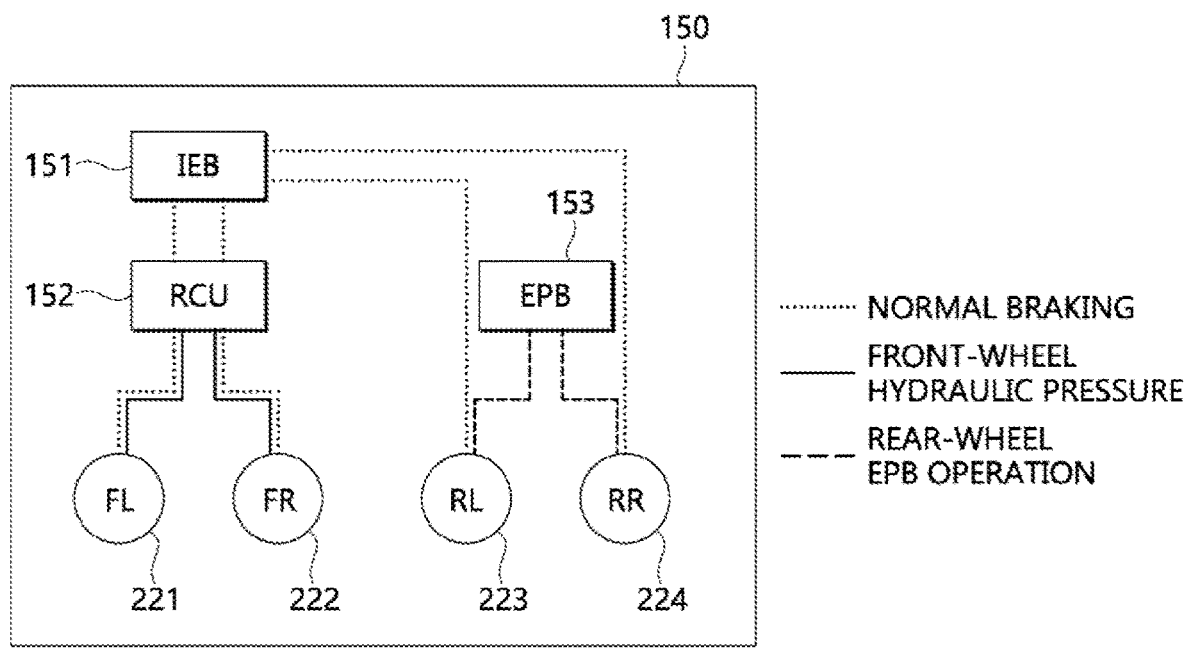
FIG. 5 is an exemplary diagram schematically illustrating a configuration and operation of the auxiliary steering unit of the redundant control system for autonomous steering according to some embodiments.

FIG. 5 is an exemplary diagram schematically illustrating a configuration and operation of the auxiliary steering unit of the redundant control system for autonomous steering according to some embodiments. The auxiliary steering unit 150 includes is an intelligent electronic brake (IEB) 151 configured to provide pressure for partial braking to the drive wheels, a redundant brake control unit (RCU) 152 configured to control partial braking of front wheels (FL) 221 and (FR) 222 for implementation of turning, and an electronic parking brake (EPB) 153 configured to control partial braking of rear wheels (RL) 223 and (RR) 224 for implementation of turning.

As illustrated in the drawing, when the main steering unit 130 is not controlled by the first autonomous control unit 120, the intelligent electronic brake 151 provides pressure for normal braking to the main drive wheels of the vehicle, for example, the wheels selected according to the front-wheel drive method or the rear-wheel drive method to implement partial braking by the primary backup mode. When the intelligent electronic brake 151 fails to control the partial braking, the second autonomous control unit 140 controls the redundant brake control unit 152 or the electronic parking brake 153 to implement partial braking by the secondary backup mode and steering by application of additional actuation.

Figure 6:
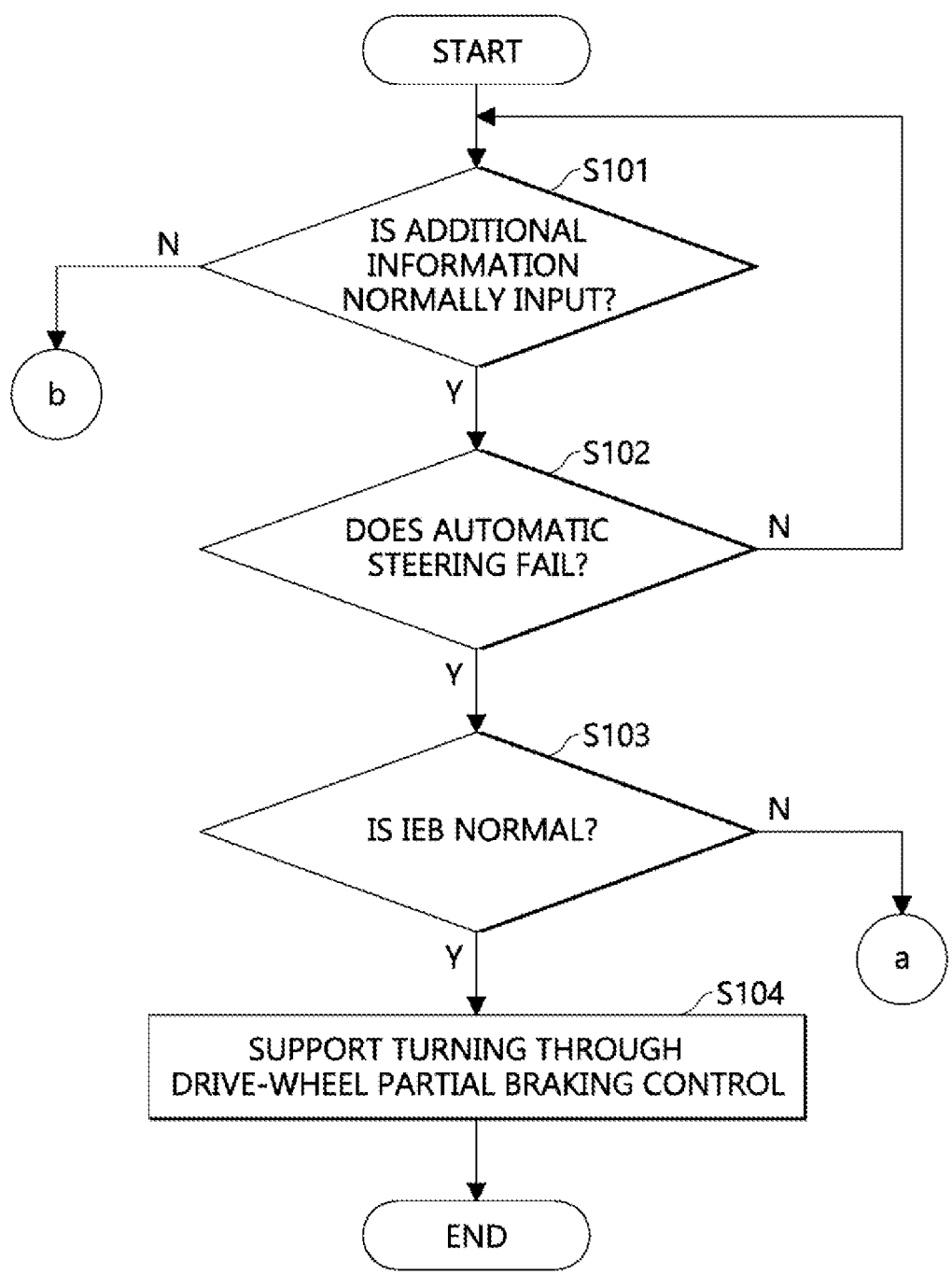
FIG. 6 is a flowchart illustrating an overall process of a redundant control method for autonomous steering according to some embodiments.

FIG. 6 is a flowchart illustrating an overall process of a redundant control method for autonomous steering according to some embodiments.

The autonomous vehicle relies on the sensing information provided from the sensor unit 110 for autonomous driving. If any one of the multiple types of additional information by the sensor unit 110 is abnormal, there is a possibility that it may lead to an accident. Accordingly, it is determined whether all of the autonomous target driving speed information, the information on whether a driving line is normal, the global positioning system (GPS) & manifold absolute pressure (MAP) information, the longitudinal acceleration sensor and lateral acceleration sensor information, and the information on whether lane change is possible, which are provided from the sensor unit 110, are normal. It is determined whether partial braking is possible based on the information on whether the autonomous steering is normal, the information on whether the main brake is normal, and the multiple types of additional information. If any of the multiple types of additional information is unavailable, the control for emergency stop is performed (S101).

It is determined whether an automatic steering function is abnormal. If the automatic steering system is normal, the first autonomous control unit 120 controls the main steering unit 130 to perform automatic steering (S102).

In the event of failure of the automatic steering function, it is determined whether the intelligent electronic brake (IEB) 151, which is the main brake, is normal. If the intelligent electronic brake (IEB) 151 malfunctions, the control by the secondary backup mode is performed for emergency stop using the multiple types of additional information (S103).

If the automatic steering function fails but the intelligent electronic brake (IEB) 151 operates normally, the intelligent electronic brake (IEB) 151, which is the main brake, is controlled to turn the vehicle through partial braking and application of additional actuation. The turning movement through the partial braking control will be described in detail later with reference to FIGS. 9 to 12 (S104).

Figure 7:
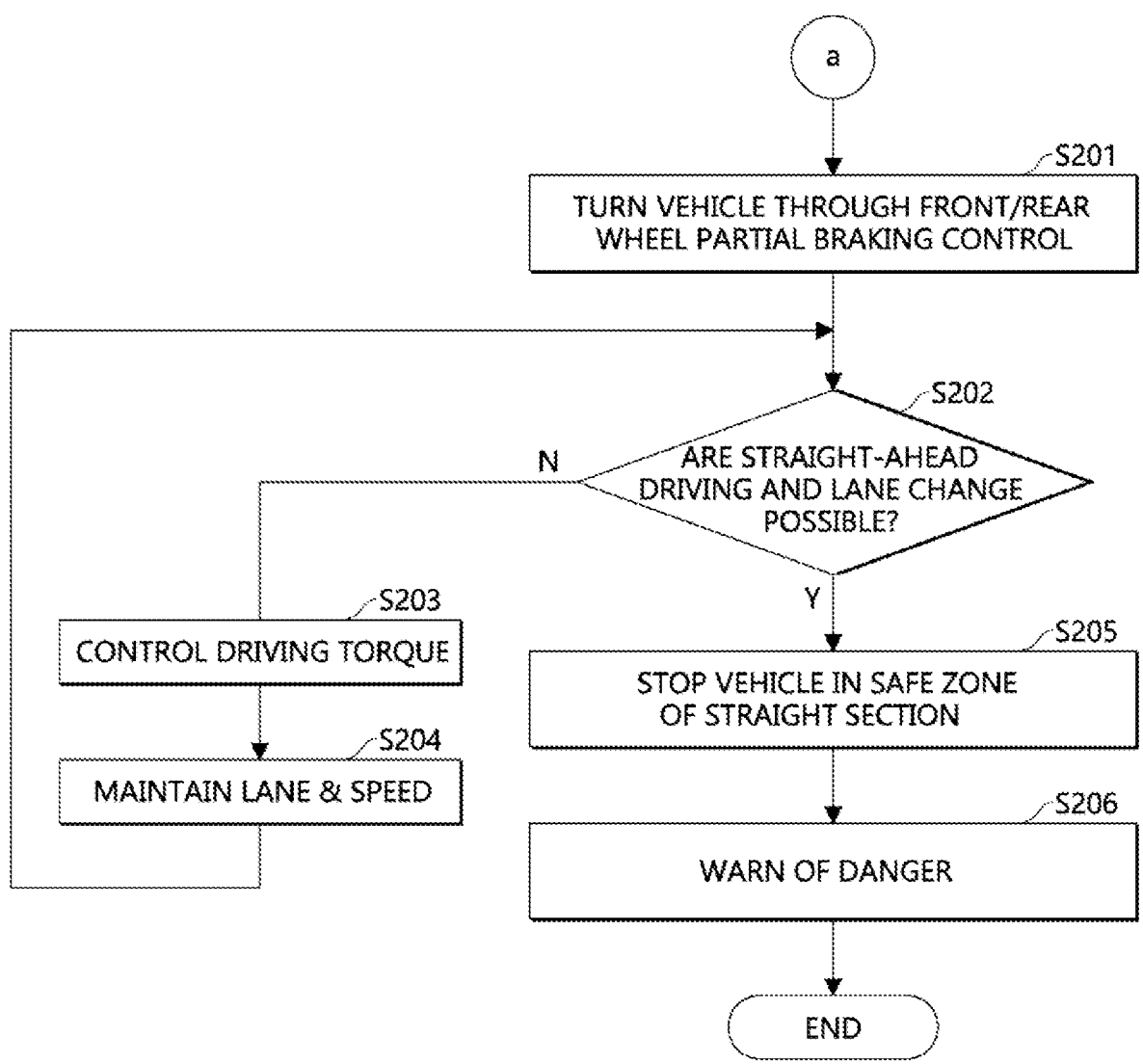
FIG. 7 is a flowchart illustrating a control process when a main brake is abnormal in the redundant control method for autonomous steering according to some embodiments.

FIG. 7 is a flowchart illustrating a control process by the secondary backup mode when the main brake is abnormal in the redundant control method for autonomous steering according to some embodiments.

If the main brake control unit malfunctions, the autonomous vehicle may not be braked, which may eventually lead to a dangerous situation. Therefore, even in such a case, it is necessary to take measures to brake the autonomous vehicle. If both the automatic steering function and the intelligent electronic brake (IEB) operate abnormally although the additional information is normally input, the vehicle turns through the front wheel partial braking control by the redundant brake control unit 152 and the rear wheel partial braking control by the electronic parking brake 153 (S201).

It is determined whether the vehicle may travel straight ahead and change lanes by turning (S202). If the vehicle may not change lanes due to surrounding vehicles, the vehicle maintains the current driving lane and driving speed are maintained (S204) while controlling the driving torque (S203).

When the autonomous vehicle may travel straight ahead and change lanes, the autonomous vehicle is stopped in the safe zone of the straight section through the front wheel braking control by the redundant brake control unit 152 and the rear wheel braking control by the electronic parking brake 153 (S205).

The alarm display unit 160 displays a dangerous situation related to emergency braking in the state in which the vehicle is completely stopped (S206).

Figure 8:
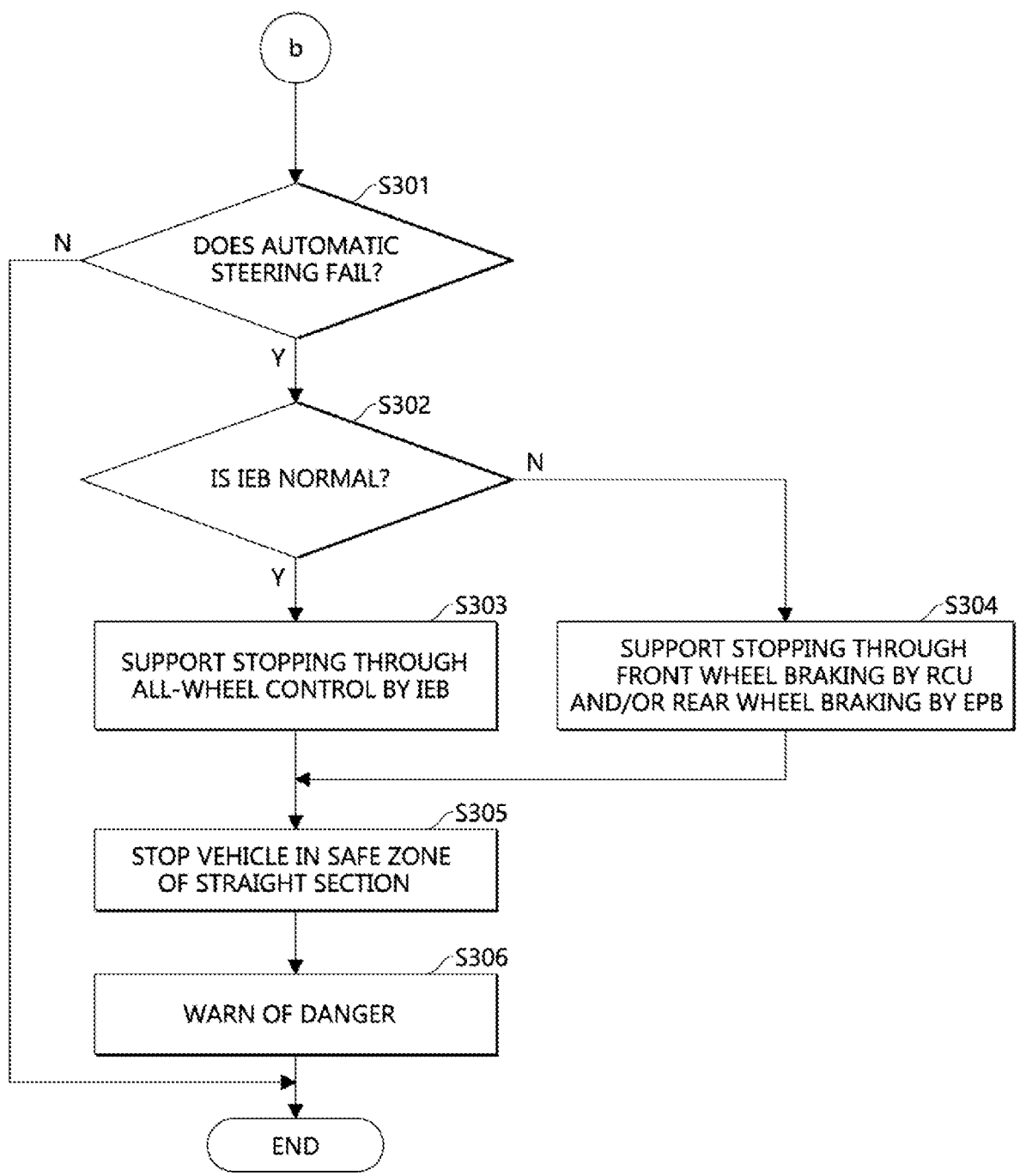
FIG. 8 is a flowchart illustrating a control process when any one of multiple types of additional information is abnormally input in the redundant control method for autonomous steering according to some embodiments.

FIG. 8 is a flowchart illustrating a control process when any one of the multiple types of additional information is abnormally input in the redundant control method for autonomous steering according to some embodiments.

Since the input additional information is not unavailable, partial braking may be implemented using the additional information. First, it is determined whether the automatic steering function is abnormal. When the automatic steering function is normally performed, the first autonomous control unit 120 is used to perform the automatic steering function (S301).

If the automatic steering function fails, it is determined whether the intelligent electronic brake (IEB) operates normally (S302).

If the automatic steering function operates abnormally but the intelligent electronic brake (IEB) is operable normally, the intelligent electronic brake (IEB) is used to support stopping by supplying braking pressure to the all-wheel brake (S303).

If both the automatic steering function and the intelligent electronic brake (IEB) operate abnormally, the redundant brake control unit 152 and/or the electronic parking brake 153 are/is used to support stopping by supplying braking pressure to the front and/or rear wheel brake (S304).

The autonomous vehicle is stopped in the safe zone of the straight section through all-wheel control by the intelligent electronic brake (IEB) 151 or through braking by the redundant brake control unit 152 and the electronic parking brake 153 (S305).

The alarm display unit 160 displays a dangerous situation related to emergency braking in the state in which the vehicle is completely stopped (S306).

Figure 9:
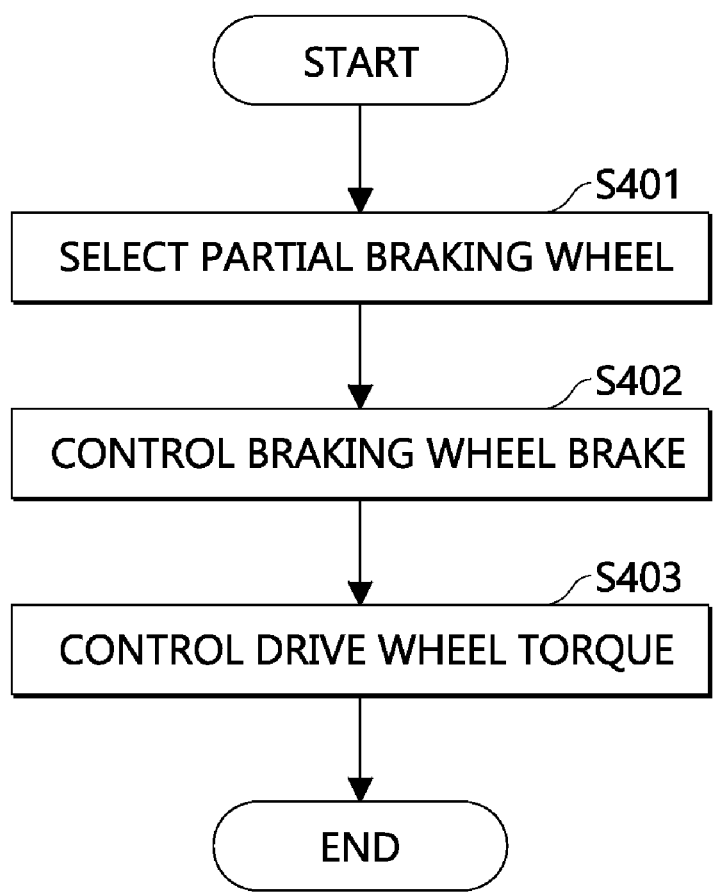
FIG. 9 is a flowchart illustrating a process of partial braking turning movement in the redundant control method for autonomous steering according to some embodiments.

FIG. 9 is a flowchart illustrating a process of partial braking turning movement in the redundant control method for autonomous steering according to some embodiments. In order to perform the partial braking implemented in the primary backup mode or secondary backup mode, a partial braking control wheel is first selected according to the turning direction and the reference drive wheel (S401), and the braking pressure supplied to the selected braking wheel is increased to the lateral-acceleration-sensor's target value (Target Ay) to perform the partial braking (S402) while controlling the torque of the drive wheel to compensate for the deceleration caused by the partial braking (S403).

Figure 10:
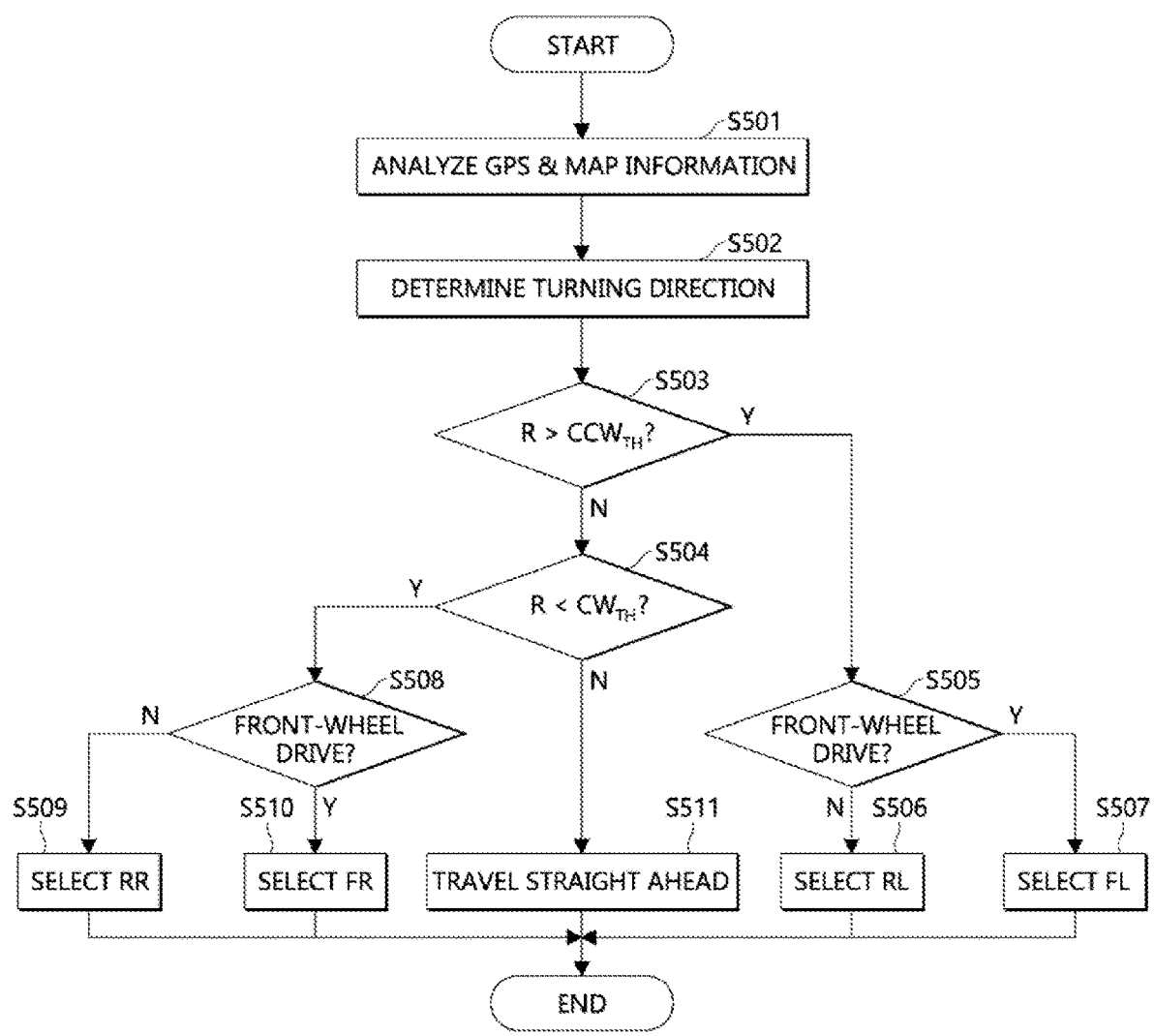
FIG. 10 is a flowchart illustrating a partial braking wheel selection process during the partial braking turning movement of FIG. 7.

FIG. 10 is a flowchart illustrating a partial braking wheel selection process during the partial braking turning movement of FIG. 7.

When the automatic steering of the autonomous vehicle fails, the second autonomous control unit 140 controls the auxiliary steering unit 150 to perform partial braking. In order to perform partial braking, it is necessary to first determine a state of the vehicle and select a wheel to be controlled. The sensing part 141 of the second autonomous control unit 140 determines a partial braking condition by the primary backup mode or the secondary backup mode based on the received information. When the partial braking condition is satisfied, the control part 142 of the second autonomous control unit 140 selects a control wheel based on the main drive wheel if the autonomous vehicle is a front-wheel drive vehicle, a rear-wheel drive vehicle, or all-wheel drive vehicle. First, the control part 142 of the second autonomous control unit 140 analyzes the received GPS and MAP information (S501). The size of a turning radius value (R) is determined based on the turning direction and the vehicle direction according to the GPS and MAP information (S502).

Then, it is determined whether the turning radius value (R) is greater than a counterclockwise determination reference value (CCW$_{TH}$) (S503). If the vehicle has to turn counterclockwise (CCW) in relation to the vehicle direction, it is determined whether the traveling vehicle is a front-wheel drive vehicle (S505). Since the vehicle has to turn counterclockwise, namely, left in relation to the vehicle direction, a front-left wheel (FL) is selected for the front-wheel drive vehicle (S507) and a rear-left wheel (RL) is selected for the rear-wheel drive vehicle (S506).

If the turning radius value (R) is not greater than the counterclockwise determination reference value (CCW$_{TH}$), it is determined whether the turning radius value (R) is smaller than a clockwise determination reference value (CW$_{TH}$) (S504). If the vehicle has to turn clockwise (CW) in relation to the vehicle direction, it is determined whether the traveling vehicle is a front-wheel drive vehicle (S508). Since the vehicle has to turn clockwise, namely, right in relation to the vehicle direction, a front-right wheel (FR) is selected for the front-wheel drive vehicle (S510) and a rear-right wheel (RR) is selected for the rear-wheel drive vehicle (S509). If the turning radius value (R) does not differ from the clockwise determination reference value or the counterclockwise determination reference value, the vehicle is kept traveling straight ahead without turning (S511).

Figure 11:
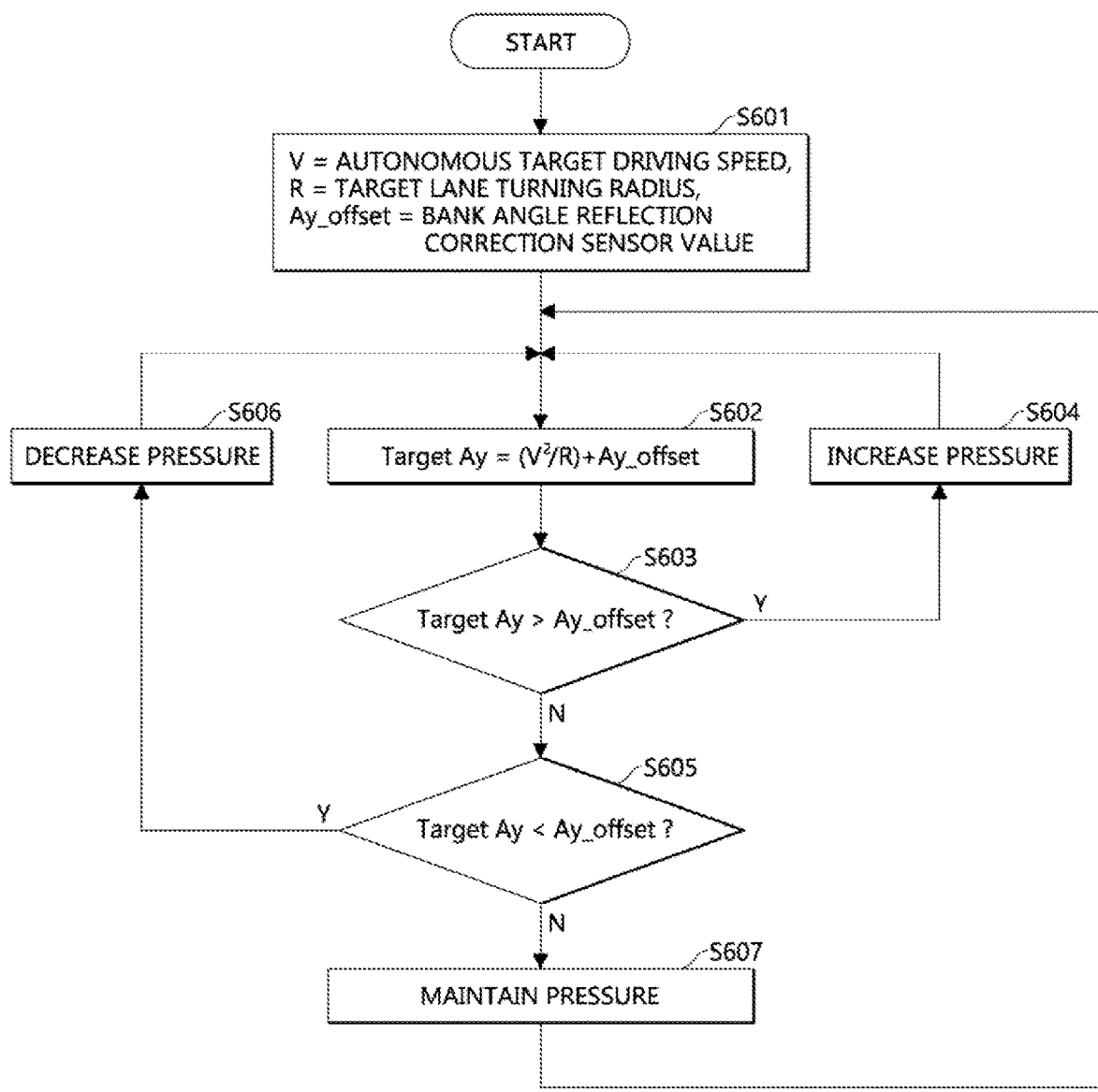
FIG. 11 is a flowchart illustrating a braking wheel brake control process during the partial braking turning movement of FIG. 7.

FIG. 11 is a flowchart illustrating a braking wheel brake control process during the partial braking turning movement of FIG. 7. It is necessary to select a braking wheel to be braked and to apply braking pressure to that wheel for allowing the vehicle to turn. The control part 142 has to calculate a pressure value that may satisfy the target turning radius value (R) through the GPS & MAP information received from the sensing part 141.

When the autonomous target driving speed is expressed as "V", the target turning radius value is expressed as "R", and the lateral acceleration sensor value is expressed as "Ay", the target turning radius value may be represented by the following equation:

$$R = \frac{V^2}{A_y}.$$

Accordingly, the target turning radius is maintained through feedback that increases the pressure to the basic target value with the lateral acceleration corresponding to $$A_y = \frac{V^2}{R},$$

and maintains, increases or decreases the pressure when the target lateral acceleration value is reached (S601).

Figure 12:
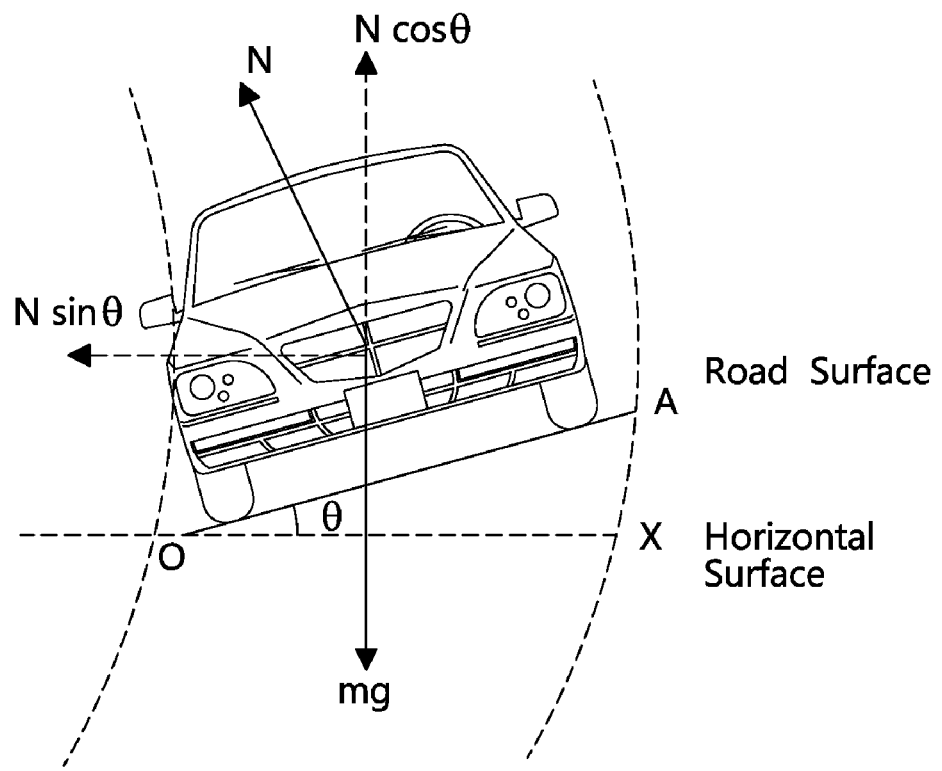
FIG. 12 is an exemplary view illustrating correction of lateral acceleration on a road surface with an angle of inclination.

In this case, when the vehicle is positioned on a road surface having an angle of inclination (θ) as illustrated in FIG. 12, the lateral acceleration sensor receives a centrifugal force corresponding to N sin θ, which results in a contaminated lateral acceleration value differently for each vehicle depending on the dynamics of the vehicle.

Therefore, it is necessary to reflect the correction value for each angle of inclination. When the correction value for each angle of inclination is expressed as Ay_offset, the lateral-acceleration-sensor's target value (Target Ay) is calculated by the following equation (S602):

$$\text{Target } A_y = \frac{V^2}{R} + A_{y\ \text{offset}}.$$

When it is determined that the vehicle is abnormally steered, it is possible to select a wheel on which the vehicle may be steered optimally and stably in consideration of a gradient, and to calculate braking torque to be applied to the wheel. When the vehicle turns on a downhill road, the control part 142 may select the front wheels of the vehicle to apply the braking torque thereto. On the other hand, when the vehicle turns on an uphill road, the control part 142 may select the rear wheels of the vehicle to apply the braking torque thereto. In this case, the magnitude of the braking torque applied to the selected front wheels and rear wheels may be calculated differently depending on the magnitude of the angle of inclination.

For example, the lateral-acceleration-sensor's target value (Target Ay) is compared with the correction value for each angle of inclination (Ay_offset) (S603). As a result, if the lateral-acceleration-sensor's target value (Target Ay) is greater than the correction value for each angle of inclination (Ay_offset), the target value is not yet reached. Therefore, the amount of turning is increased by increasing the braking pressure supplied to the braking wheel (S604).

Conversely, if the correction value for each angle of inclination (Ay_offset) is greater than the lateral-acceleration-sensor's target value (Target Ay) (S605), it may deviate from the target turning direction since the braking pressure supplied to the braking wheel is large. Therefore, the amount of turning is reduced by decreasing the braking pressure (S606).

When there is no difference between the lateral-acceleration-sensor's target value (Target Ay) and the correction value for each angle of inclination (Ay_offset), the current braking pressure supplied to the braking wheel is maintained (S607).

Figure 13:
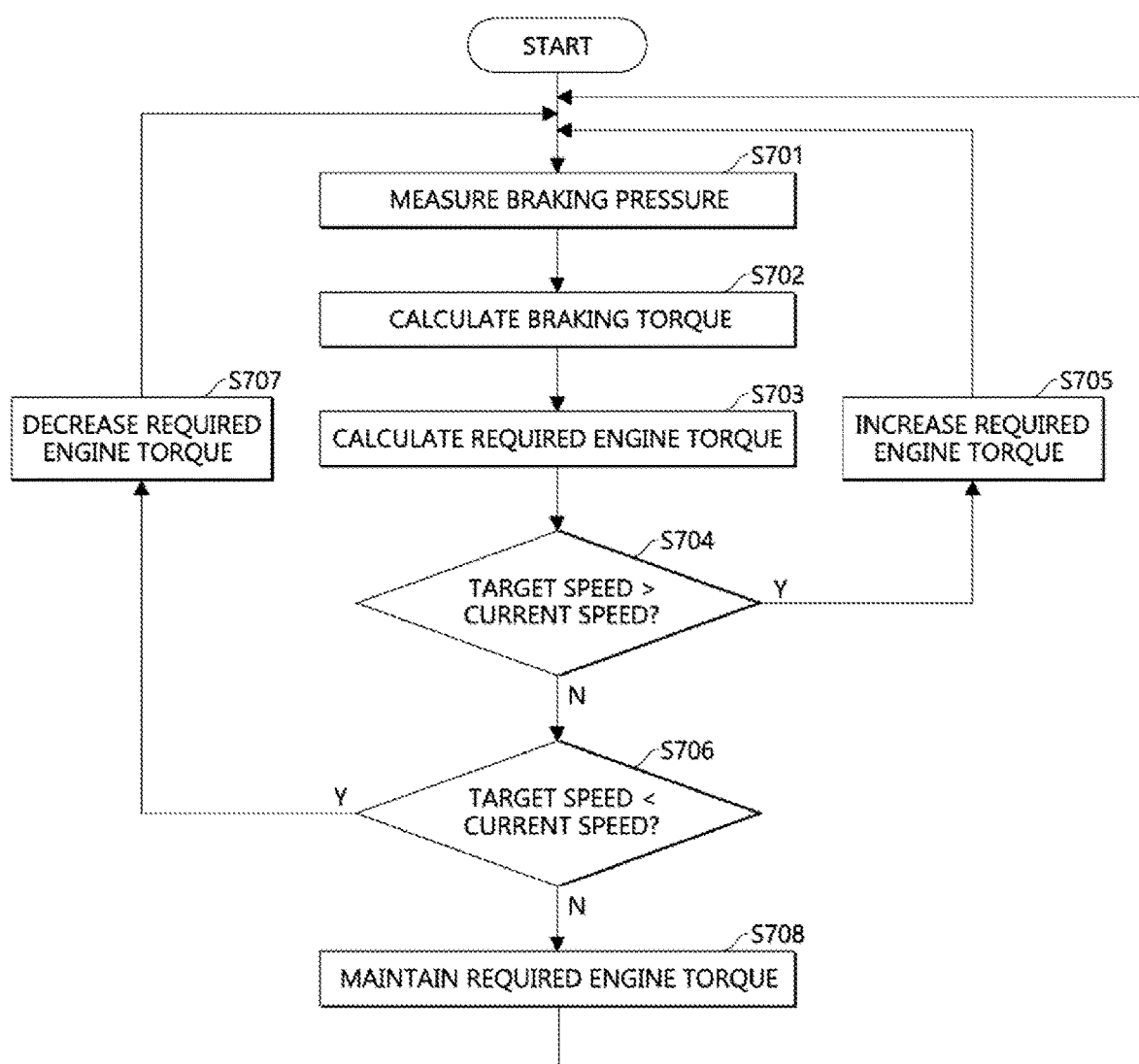
FIG. 13 is a flowchart illustrating a drive wheel torque control process during the partial braking turning movement of FIG. 7.

FIG. 13 is a flowchart illustrating a drive wheel torque control process during the partial braking turning movement of FIG. 7.

When the turning movement is performed through partial braking, a decrease in speed inevitably occurs. However, since the autonomous vehicle must maintain a set target driving speed, it is necessary to maintain the driving speed by increasing the engine (motor) torque corresponding to the partial braking force. Braking is hydraulic or pneumatic, and may be converted and measured into braking torque for each speed as illustrated in FIG. 14 according to the braking factor of the vehicle through a device such as a disc brake to generate manifold absolute pressure (MAP).

Figure 14:
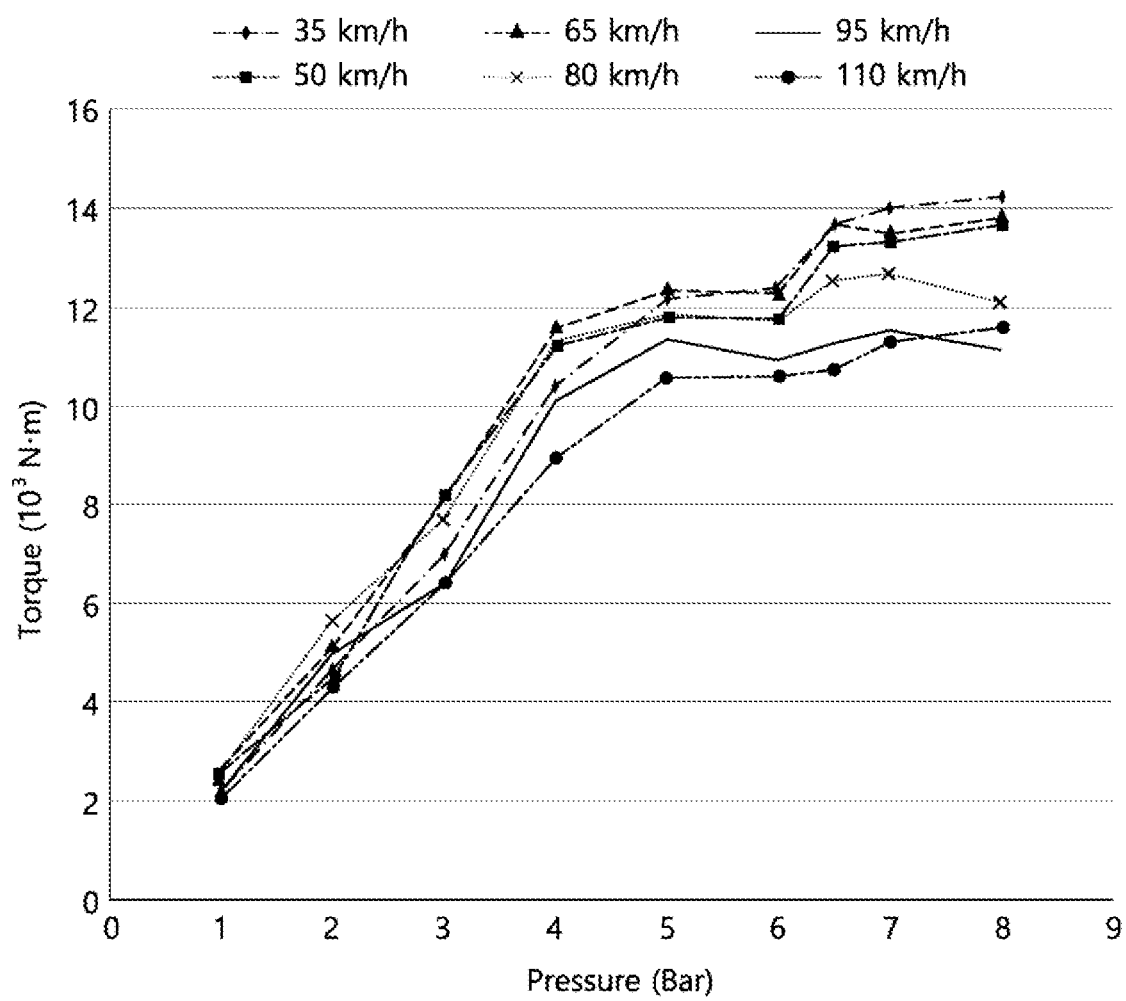
FIG. 14 is an exemplary graph illustrating a MAP of braking torque versus braking pressure for each speed.

FIG. 14 is an exemplary graph illustrating the MAP of braking torque versus braking pressure for each speed. This may be used to compensate for the deceleration caused by the braking pressure applied to the braking device in order to maintain the target speed. The second autonomous control unit reflects the MAP and controls the driving torque of the engine. That is, the deceleration needs to be corrected by comparing the autonomous target driving speed with the current vehicle speed and calculating the required change torque to control the required drive wheel acceleration. First, the braking pressure supplied to the braking wheel is measured (S701), and the braking torque value corresponding to the same is calculated with reference to the MAP of FIG. 14.

That is, it is necessary to compensate for the deceleration of the braking control by basically applying the increase in driving force corresponding to the applied braking pressure and controlling the feedback to the engine torque to maintain the target speed (S703).

In order to compensate for the braking wheel torque value corresponding to the braking torque MAP, the required engine torque must be calculated. The required engine torque is calculated by reflecting the driveline factor based on the engine torque MAP. The driveline factor may include a gear ratio of the powertrain, a differential gear ratio, a constant in consideration of efficiency, and the like. The required engine torque refers to a driving torque to be supplied to the wheel in consideration of the acceleration demand situation and the gear range (S703).

In order to maintain the target speed, the driving torque is applied to increase the driving force corresponding to the applied braking force, and the engine driving torque must be controlled to maintain the target speed. The target driving speed is compared with the current speed, and when the target speed is greater than the current speed (S704), the required engine torque is increased (S705). If the current speed is greater than the target speed (S706), the required engine torque is decreased (S707). If the current speed coincides with the target speed, the required current engine torque is maintained (S708).

As described above, the redundant control system and method for autonomous steering may implement the secondary backup mode by maintaining lane and speed through partial braking in case of failure of automatic steering and using the auxiliary brake control unit (RCU/EPB) in consideration of failure of the main braking control unit (IEB) for partial braking in the vehicle equipped with the autonomous steering system and the redundant braking system. Accordingly, since the redundant braking system may be utilized without configuration of additional hardware, it may be effective in terms of economic feasibility and structural arrangement.

As is apparent from the above description, the redundant control system and method for autonomous steering enable the autonomous vehicle to travel at a normal target speed and steering angle even when it is impossible to respond to turning movement due to failure of the automatic steering system. The redundant control system and method for autonomous steering may use the braking system with redundancy to take into account the failure of the main braking system as well as the primary backup of the steering system, thereby ensuring autonomous steering stability.

Although the present invention has been described with respect to the preferred embodiments, it will be understood by those skilled in the art that various modifications and variations can be made without departing from the spirit and scope of the invention as defined in the following claims.

What is claimed is:

1. A redundant control system for autonomous steering, comprising:
    a sensor in a vehicle configured to sense information for autonomous driving;
    a steering motor to perform steering;
    a first autonomous controller configured to use data provided from the sensor to determine a target steering angle through real-time lane recognition and to control the steering motor;
    a brake module composed of a main brake and an auxiliary brake to perform steering; and
    a second autonomous controller configured to perform supplementary steering through partial braking and application of additional actuation in an event of abnormal operation of an automatic steering function using the first autonomous controller and to control backup braking through the auxiliary brake when the main brake fails,
    wherein the second autonomous controller is configured to:
        determine whether a primary steering backup mode and a secondary steering backup mode are present;
        select a partial braking control wheel according to a turning direction and a reference drive wheel and to increase braking pressure to a lateral-acceleration-sensor's target value (Target Ay) to perform partial braking while compensating for deceleration caused by the partial braking; and
        perform engine control by increasing or decreasing pressure applied to the main brake and/or the auxiliary brake in response to a partial braking pressure control signal.

2. The redundant control system according to claim 1, wherein the second autonomous controller is further configured to determine whether partial braking is possible based on information on whether autonomous steering is normal, information on whether the main brake is normal, and multiple types of additional information.

3. The redundant control system according to claim 2, wherein the additional information comprises autonomous target driving speed information, information on whether a driving line is normal, global positioning system (GPS) & manifold absolute pressure (MAP) information, longitudinal acceleration sensor and lateral acceleration sensor information, and information on whether a lane change is possible.

4. The redundant control system according to claim 3, wherein the second autonomous controller is further configured to determine that the partial braking is impossible when the additional information is abnormal or when an engine torque is unavailable.

5. The redundant control system according to claim 4, wherein the second autonomous controller is further configured to, upon determining that the partial braking is impossible, control all of a plurality of drive wheels to decelerate and stop the vehicle safely.

6. The redundant control system according to claim 5, wherein the second autonomous controller is further configured to transmit an alarm related to emergency braking to an inside and outside of the vehicle.

7. The redundant control system according to claim 1, wherein the second autonomous controller comprises:
    an intelligent electronic brake (IEB) configured to provide pressure for partial braking to drive wheels;
    a redundant brake controller (RCU) configured to control front-wheel partial braking for implementation of turning; and
    an electronic parking brake (EPB) configured to control rear-wheel partial braking for implementation of turning.

8. The redundant control system according to claim 1, wherein, when an autonomous target driving speed is expressed as "V", a target turning radius is expressed as "R", and a corrected lateral acceleration sensor value according to a bank angle is expressed as "Ay_offset", and a target value (Target Ay) of the lateral acceleration sensor value is calculated by the following equation:

$$\text{Target } Ay = (V^2/R) + Ay\_\text{offset}.$$

9. The redundant control system according to claim 1, wherein the second autonomous controller is further configured to control partial braking by selecting a right wheel when a vehicle direction turning radius value is clockwise and selecting a left wheel when the vehicle direction turning radius value is counterclockwise.

10. The redundant control system according to claim 1, wherein the second autonomous controller is further configured to compare an autonomous target driving speed with a current vehicle speed and calculates required change torque for controlling required drive wheel acceleration to correct deceleration.

11. A redundant control method for autonomous steering, comprising:
   determining, by a first controller, whether partial braking control is possible;
   determining, by the first controller, whether a steering motor is abnormal;
   determining, by the first controller, whether a main brake controller is abnormal;
   controlling, by the first controller, turning of a vehicle through partial braking and application of additional actuation by the main brake controller when the steering motor is abnormal and the main brake controller is normal; and
   controlling, by a second controller, turning and stopping of the vehicle through partial braking and application of additional actuation by an auxiliary brake controller when the steering motor and the main brake controller are abnormal,
   wherein each of the steps of controlling turning of the vehicle and controlling turning and stopping of the vehicle comprises:
      selecting a partial braking control wheel according to a turning direction and a reference drive wheel;
      increasing braking pressure to a lateral-acceleration-sensor's target value (Target Ay) to perform partial braking; and
      compensating for deceleration caused by the partial braking.

12. The redundant control method according to claim 11, further comprising decelerating and stopping the vehicle safely by controlling all drive wheels of a plurality of drive wheels when it is determined that the partial braking control is impossible.

13. The redundant control method according to claim 11, wherein determining whether partial braking is possible is based on information on whether autonomous steering is normal, information on whether a main brake is normal, and multiple types of additional information.

14. The redundant control method according to claim 13, wherein the additional information comprises autonomous target driving speed information, information on whether a driving line is normal, global positioning system (GPS) & manifold absolute pressure (MAP) information, longitudinal acceleration sensor and lateral acceleration sensor information, and information on whether a lane change is possible.

15. The redundant control method according to claim 11, wherein the selecting the partial braking control wheel comprises selecting a right wheel when a vehicle direction turning radius value is clockwise and selecting a left wheel when the vehicle direction turning radius value is counterclockwise.

16. The redundant control method according to claim 11, wherein the compensating for deceleration caused by the partial braking comprises comparing an autonomous target driving speed with a current vehicle speed and calculating required change torque for controlling required drive wheel acceleration to correct deceleration.

* * * * *